US009753728B2

(12) United States Patent
Tominaga et al.

(10) Patent No.: US 9,753,728 B2
(45) Date of Patent: Sep. 5, 2017

(54) APPARATUS AND MEDIUM FOR CONVERTING A PERSISTENT WAIT INSTRUCTION TO AN INSTRUCTION FOR PERIODICALLY WAITING FOR A CONTROL TARGET

(71) Applicant: FUJI XEROX CO., LTD., Tokyo (JP)

(72) Inventors: Daizo Tominaga, Kanagawa (JP); Takumi Kawahara, Kanagawa (JP); Shotaro Miyamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 296 days.

(21) Appl. No.: 14/660,148

(22) Filed: Mar. 17, 2015

(65) Prior Publication Data

US 2015/0324201 A1 Nov. 12, 2015

(30) Foreign Application Priority Data

May 8, 2014 (JP) ................................ 2014-096898

(51) Int. Cl.
| G06F 9/30 | (2006.01) |
| G06F 11/07 | (2006.01) |
| G06F 12/0875 | (2016.01) |
| G06F 12/084 | (2016.01) |
| G06F 9/38 | (2006.01) |
| G06F 9/48 | (2006.01) |

(52) U.S. Cl.
CPC ...... *G06F 9/30076* (2013.01); *G06F 9/30181* (2013.01); *G06F 9/3861* (2013.01); *G06F 9/4843* (2013.01); *G06F 11/0793* (2013.01); *G06F 12/084* (2013.01); *G06F 12/0875* (2013.01); *G06F 2212/281* (2013.01); *G06F 2212/452* (2013.01)

(58) Field of Classification Search
CPC .. G06F 9/30076; G06F 9/3861; G06F 9/3877; G06F 9/48; G06F 9/4806; G06F 9/4843; G06F 9/485; G06F 11/07; G06F 11/0703; G06F 11/0793; G06F 13/10; G06F 9/30181

See application file for complete search history.

(56) References Cited

U.S. PATENT DOCUMENTS 6,247,067 B1 * 6/2001 Berliner .............. G06F 9/45537
719/321
6,738,514 B1 * 5/2004 Shin ...................... G06F 3/0488
382/187

(Continued)

FOREIGN PATENT DOCUMENTS

| JP | H05-324571 A | 12/1993 |
| JP | H11-053207 A | 2/1999 |
| JP | 2005-324574 A | 11/2005 |

*Primary Examiner* — David J Huisman
(74) *Attorney, Agent, or Firm* — Oliff PLC

(57) ABSTRACT

An information processing apparatus includes a first controller that is controlled by a first operating system and a second controller that is controlled by a second operating system different from the first operating system. The first controller outputs a waiting instruction waiting persistently until a response is transmitted from a control target. The second controller converts the waiting instruction outputted from the first controller into a periodic instruction waiting periodically until a response is transmitted from the control target, and outputs the periodic instruction to the control target.

5 Claims, 2 Drawing Sheets

(56) References Cited

U.S. PATENT DOCUMENTS

| | | | |
|---|---|---|---|
| 2009/0313643 A1* | 12/2009 | Su | G06F 9/45537 719/323 |
| 2010/0156669 A1* | 6/2010 | Kim | G08G 1/08 340/917 |
| 2010/0185833 A1* | 7/2010 | Saito | G06F 1/3203 712/203 |
| 2010/0262672 A1* | 10/2010 | Sugiyama | G06Q 20/3278 709/208 |

* cited by examiner

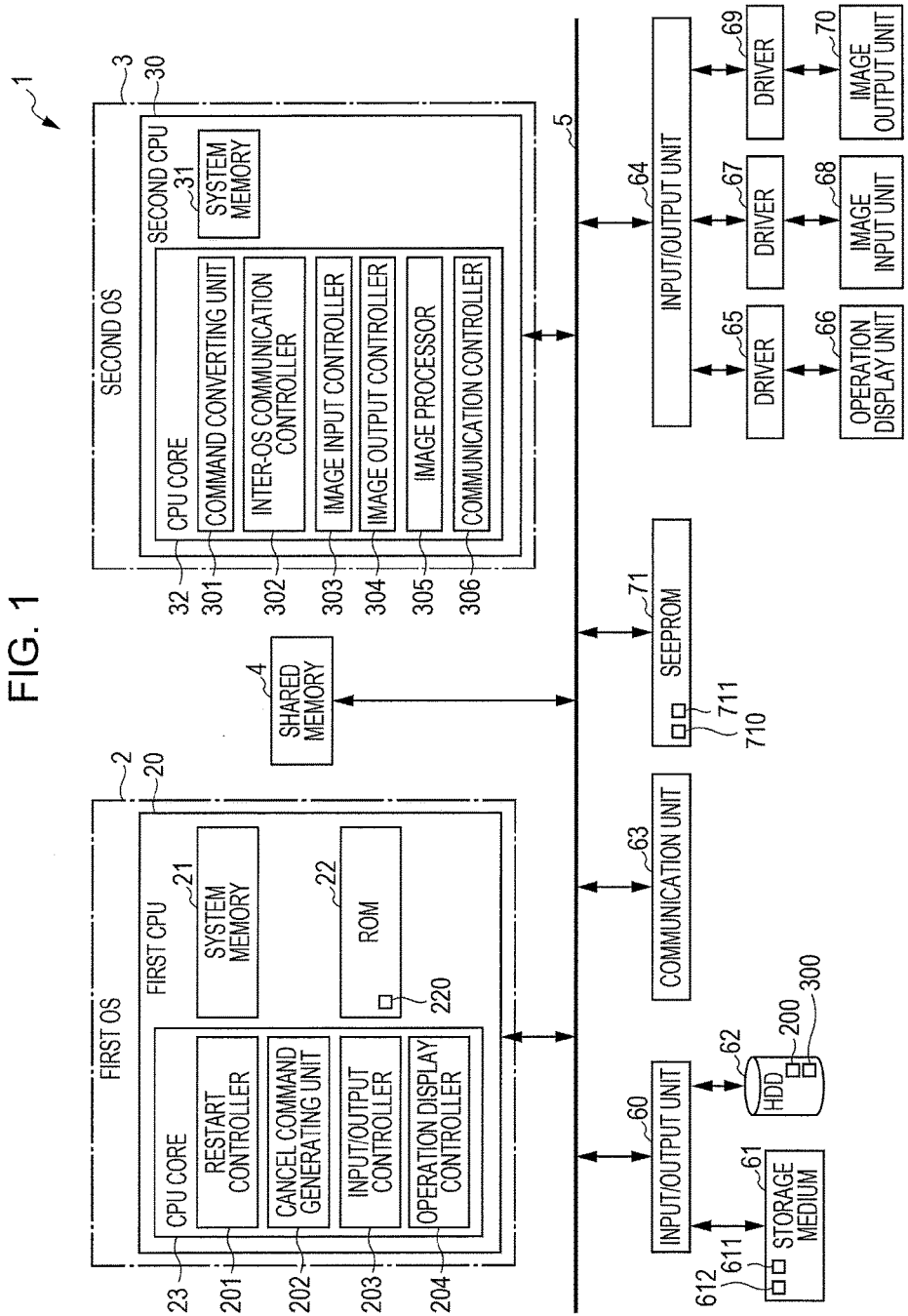

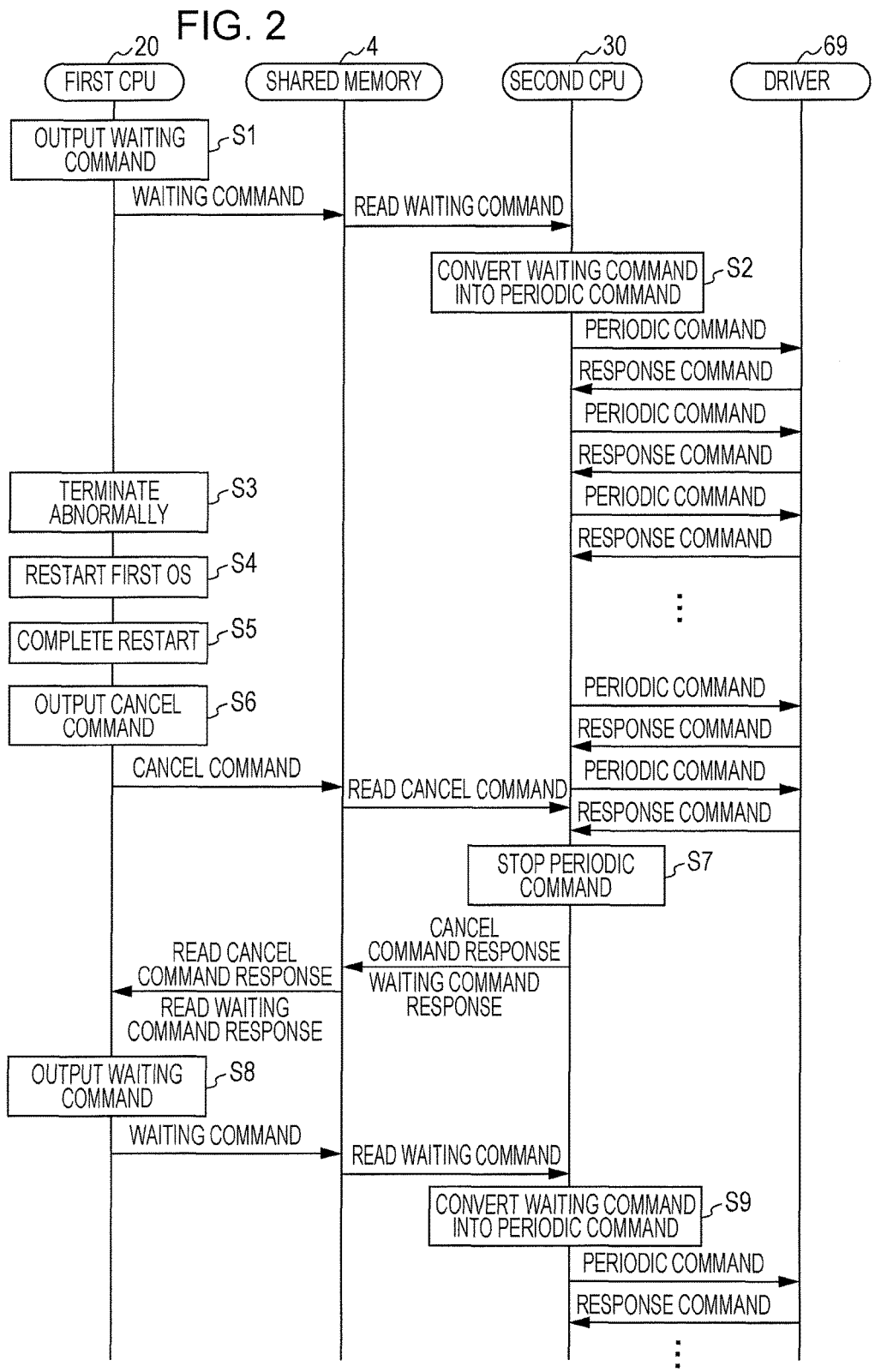

APPARATUS AND MEDIUM FOR CONVERTING A PERSISTENT WAIT INSTRUCTION TO AN INSTRUCTION FOR PERIODICALLY WAITING FOR A CONTROL TARGET

CROSS-REFERENCE TO RELATED APPLICATIONS

This application is based on and claims priority under 35 USC 119 from Japanese Patent Application No. 2014-096898 filed May 8, 2014.

BACKGROUND

Technical Field

The present invention relates to an information processing apparatus and a non-transitory computer readable medium.

SUMMARY

According to an aspect of the invention, there is provided an information processing apparatus including a first controller that is controlled by a first operating system and a second controller that is controlled by a second operating system different from the first operating system. The first controller outputs a waiting instruction waiting persistently until a response is transmitted from a control target. The second controller converts the waiting instruction outputted from the first controller into a periodic instruction waiting periodically until a response is transmitted from the control target, and outputs the periodic instruction to the control target.

BRIEF DESCRIPTION OF THE DRAWINGS

Exemplary embodiments of the present invention will be described in detail based on the following figures, wherein:

FIG. 1 is a block diagram illustrating an exemplary configuration of an information processing apparatus according to an exemplary embodiment of the present invention; and FIG. 2 is a timing chart for describing an exemplary operation of the information processing apparatus according to the exemplary embodiment of the present invention.

DETAILED DESCRIPTION

Exemplary Embodiment

Overall Configuration of Information Processing Apparatus 1

FIG. 1 is a block diagram illustrating an exemplary configuration of an information processing apparatus according to an exemplary embodiment of the present invention. An information processing apparatus 1 is, for example, a loosely coupled multiprocessor system in which a first central processing unit (CPU) 20 and a second CPU 30 which operate on the basis of operating systems (OS) different from each other are connected to each other via a system bus 5.

The operating systems different from each other are a first OS 2 and a second OS 3. The first OS 2 is an OS having a real-time property lower than that of the second OS 3. The first OS 2 is an OS, for example, based on the Linux® architecture, and the second OS 3 is an OS, for example, based on the ARM® architecture.

The system bus 5 is a common path for the first CPU 20, the second CPU 30, and the like which exchange signals, information, and the like. The system bus 5 is connected to a shared memory 4 which may be accessed by the first CPU 20 and the second CPU 30. The system bus 5 is connected to a storage medium 61 and a hard disk drive (HDD) 62 via an input/output unit 60 located on the first CPU 20 side. The system bus 5 is connected to various drivers 65, 67, and 69 via an input/output unit 64 located on the second CPU 30 side. The drivers 65, 67, and 69 are connected to an operation display unit 66, an image input unit 68, and an image output unit 70, respectively. The system bus 5 is connected to a SEEPROM (serial electrically erasable programmable read only memory) 71 and a communication unit 63 for connecting the information processing apparatus 1 to a local area network (LAN) or the like. The operation display unit 66, the image input unit 68, and the image output unit 70 are exemplary devices to be controlled.

The information processing apparatus 1 is, for example, an image forming apparatus provided with a scanner function of optically reading a document, a printer function/copying function of forming an image on a sheet of paper and printing it, a storage function of storing image data of a read document in a storage medium, a transmission function of transmitting the image data to electronic equipment which is electromagnetically connected via a network, and the like. The electromagnetic connection is achieved by using at least one of connection through a conductive body, connection using light which is a kind of electromagnetic wave, and connection via radio waves which are a kind of electromagnetic wave.

For example, as illustrated in FIG. 1, the information processing apparatus 1 schematically includes the first CPU 20 that is controlled by the first OS 2 and the second CPU 30 that is controlled by the second OS 3. The first CPU 20 outputs a waiting command which persistently waits until a response is transmitted from a device. The second CPU 30 converts a waiting command outputted from the first CPU 20 into a periodic command which periodically waits until a response is transmitted from a device, and outputs the periodic command to the device.

The first CPU 20, the second CPU 30, and the shared memory 4 are examples of a first controller, a second controller, and a shared storage, respectively. The waiting command and the periodic command are examples of a waiting instruction and a periodic instruction, respectively.

The storage medium 61 is, for example, a nonvolatile semiconductor memory. The storage medium 61 stores a first OS image 611, a second OS image 612, and the like.

The HDD 62 is a nonvolatile mass storage. The HDD 62 stores an application 200 for controlling operations of the first CPU 20 and an application 300 for controlling operations of the second CPU 30. The applications 200 and 300 are exemplary information processing programs.

The SEEPROM 71 is, for example, a nonvolatile semiconductor memory. The SEEPROM 71 stores boot information 710 and product information 711. The boot information 710 is, for example, information about overall setting or the like of the information processing apparatus 1. The product information 711 is, for example, information including setting such as an operation clock.

Configuration of First CPU 20

As illustrated in FIG. 1, the first CPU 20 is a processor performing calculation, processing, and the like on obtained data under instructions from the first OS 2. The first CPU 20 includes a system memory 21, a ROM 22, and a CPU core 23. The first OS 2 is, for example, software activated by loading the first OS image 611 stored in the storage medium 61 into the system memory 21. For example, the activation of the first OS 2 causes the application 200 stored in the HDD 62 to be loaded into the system memory 21.

The CPU core 23 operates according to the application 200, thereby functioning as a restart controller 201, a cancel command generating unit 202, an input/output controller 203, an operation display controller 204, and the like.

When the first OS 2 is abnormally terminated (for example, crashed), the restart controller 201 performs a process for activating the application 200 on the first OS 2 again.

When the first OS 2 is restarted, the cancel command generating unit 202 stores a cancel command in the shared memory 4. The cancel command is a command for stopping a periodic command.

The input/output controller 203 controls the input/output unit 60 and the input/output unit 64. The input/output controller 203 controls the storage medium 61 and the HDD 62 via the input/output unit 60 so as to achieve the storage function.

The operation display controller 204 supplies an instruction to the second CPU 30, thereby controlling the operation display unit 66 via the driver 65. The operation display unit 66 has a configuration, for example, in which a touch sensor serving as an input unit for receiving an input from an operator overlies a monitor serving as a display unit for displaying an image such as a menu. Switching to/from the power saving mode is performed, for example, through an operation performed on the operation display unit 66.

The first CPU 20 includes the system memory 21 and the ROM 22.

The system memory 21 is a volatile semiconductor memory. The system memory 21 is a readable and writable random access memory (RAM), and is used as a storage area for temporarily storing a calculation result or the like.

The ROM 22 is a nonvolatile semiconductor memory. The ROM 22 stores, for example, a boot loader 220. The boot loader 220 is basic software for activating the first OS 2 and the second OS 3.

When power is turned on, on the basis of the boot loader 220 stored in the ROM 22, the first CPU 20 reads out the first OS image 611 and the second OS image 612 from the storage medium 61, and reads out the boot information 710 and the product information 711 stored in the SEEPROM 71. The first CPU 20 loads the first OS image 611 into the system memory 21 and loads the second OS image 612 into the shared memory 4 on the basis of the first OS image 611, the second OS image 612, the boot information 710, and the product information 711 which are thus read out, and activates the first OS 2 and the second OS 3.

Configuration of Second CPU 30

As illustrated in FIG. 1, the second CPU 30 is a processor performing calculation, processing, and the like on obtained data under instructions from the second OS 3. The second CPU 30 includes a system memory 31 and a CPU core 32. The second OS 3 is software activated, for example, by loading the second OS image 612 stored in the storage medium 61 into the shared memory 4. For example, the activation of the second OS 3 causes the application 300 stored in the HDD 62 to be loaded into the system memory 31.

The second CPU 30 includes the system memory 31. The system memory 31 is a volatile semiconductor memory. The system memory 31 is a readable and writable RAM, and is used as a storage area for temporarily storing a calculation result and the like.

The CPU core 32 operates according to the application 300, thereby functioning as a command converting unit 301, an inter-OS communication controller 302, an image input controller 303, an image output controller 304, an image processor 305, a communication controller 306, and the like.

The command converting unit 301 converts a waiting command which is persistent and which is output from the first CPU 20 into a periodic command which is periodic.

The waiting command is, for example, a command stored in a queue in the driver 65, 67, or 69, and a command which waits for a response from the device without a time limit. The device is, for example, the operation display unit 66, the image input unit 68, or the image output unit 70.

The periodic command is a command which periodically waits for a response from the device. The periodic command is output, for example, at time intervals (for example, one second) of an integral multiple of the clock frequency of the second CPU 30. The period for which a periodic command according to the exemplary embodiment is valid is, for example, one second, but may be changed in accordance with the specification of the device.

The waiting command is a command which persistently waits for a response, and the periodic command is a command which periodically waits for a response. Since the periodic command is repeatedly supplied until a response is transmitted, the periodic command is substantially equivalent to the waiting command.

The first OS 2 outputs a waiting command to the shared memory 4. The second CPU 30 reads the waiting command from the shared memory 4 through inter-OS communication, and outputs it to the driver 65, 67, or 69. Then, when the first OS 2 is abnormally terminated due to some cause, the first OS 2 starts restarting. When the first OS 2 restarts, the first OS 2 does not store information describing that the waiting command has been output before the abnormal termination. Therefore, the first OS 2 outputs a waiting command to the shared memory 4 again. This causes multiple waiting commands to be accumulated in the driver 65, 67, or 69. Even when a response is transmitted from the device, the waiting command which has been output after the restart still remains in the driver 65, 67, or 69 and has waited for a response. This may cause a malfunction.

The command converting unit 301 converts a waiting command into a periodic command, and stops a periodic command by using a cancel command supplied after the restart, enabling occurrence of a malfunction described above to be suppressed.

The command converting unit 301 converts a waiting command that is persistent and that is output from the first CPU 20 which is an upstream CPU into a periodic command that is periodic, in the second CPU 30 which is a downstream CPU. The command converting unit 301 outputs the periodic command to the driver 65, 67, or 69. For example, if the upstream CPU outputs a periodic command to a driver so as to wait for a response, the periodic command and the response command pass through a path which goes through the system bus 5, the shared memory 4, the system bus 5, the downstream CPU, the system bus 5, the input/output unit 64, and the driver 65, 67, or 69, causing the processing to take time. However, in the information processing apparatus 1, the command converting unit 301 of the second CPU 30 located downstream converts a waiting command into a periodic command, and the periodic command and the response command may be transmitted in a path which goes through the system bus 5 and the input/output unit 64 and which is shorter than the above-described path, achieving fast processing.

The inter-OS communication controller 302 controls communication between the first CPU 20 and the second CPU 30 through the system bus 5.

The image input controller 303 controls the image input unit 68 through the driver 67, achieving the scanner function. The image input unit 68 optically reads a document as image data.

The image output controller 304 controls the image output unit 70 through the driver 69, achieving the printer function and the copying function. The image output unit 70 forms an image on a sheet of paper, for example, by using an electrophotographic system and prints it.

The image processor 305 performs a specified process on image data obtained from the storage medium 61, the HDD 62, the image input unit 68, or the like. The specified process is, for example, a process of converting the format of the image data in accordance with the storage format specified through the operation display unit 66.

The communication controller 306 controls the communication unit 63 so as to achieve a communication function.

Configuration of Shared Memory 4

As the shared memory 4, for example, a volatile semiconductor memory may be used. The shared memory 4 is, for example, obtained by allocating a part of the area of the system memory 21. The shared memory 4 is not limited to a part of the system memory 21, and may be constructed independently of the system memory 21 by using a volatile or nonvolatile semiconductor memory. The shared memory 4 is provided to achieve, for example, the inter-OS communication between the first OS 2 and the second OS 3.

When a command is to be output from the first CPU 20 to the second CPU 30, the command is temporarily stored in the shared memory 4. The second CPU 30 checks the shared memory 4 and reads the command, whereby the inter-OS communication is performed. The first CPU 20 and the second CPU 30, for example, periodically check the shared memory 4.

Operation of Information Processing Apparatus 1

An exemplary operation performed by the information processing apparatus 1 will be described below according to the timing chart in FIG. 2. Specifically, an exemplary operation performed after the information processing apparatus 1 outputs a waiting command, until the information processing apparatus 1 is abnormally terminated and restarts will be described. In the description below, it is assumed that the first OS 2 and the second OS 3 are already activated.

The first CPU 20 of the information processing apparatus 1 performs the inter-OS communication to store a waiting command in the shared memory 4 via the system bus 5 (S1).

The second CPU 30 performs the inter-OS communication to check the information stored in the shared memory 4 via the system bus 5. When the waiting command is stored in the shared memory 4, the second CPU 30 reads the waiting command via the system bus 5 and stores it in the system memory 31. The second CPU 30 checks whether or not a waiting command is present, for example, at predetermined time intervals.

The command converting unit 301 converts the waiting command stored in the system memory 31 into a periodic command (S2). The second CPU 30 outputs the periodic command to a specified driver. In FIG. 2, the specified driver is, for example, the driver 69.

The driver 69 stores the periodic command outputted from the second CPU 30 in a queue, and waits for a response from the image output unit 70. When no responses are transmitted from the image output unit 70 in the period for which the periodic command is valid, the driver 69 outputs a response command indicating that no responses are transmitted, to the second CPU 30. Until the second CPU 30 receives a response command indicating that a response is transmitted from the image output unit 70, the second CPU 30 repeatedly outputs the periodic command to the driver 69. FIG. 2 illustrates a state in which no responses are transmitted from the image output unit 70 in the valid period of the periodic command, and in which the periodic command is repeatedly output to the driver 69.

When the first OS 2 is abnormally terminated due to some cause (S3), the restart controller 201 of the first CPU 20 starts restarting the first OS 2 (S4). As long as no responses are transmitted from the image output unit 70, while the restart process is being performed, the periodic command is repeatedly output under the control of the second CPU 30. When a response is transmitted from the image output unit 70 while the restart process is being performed, the second CPU 30 performs the inter-OS communication to store a response command indicating that a response has been transmitted, in the shared memory 4. When the first OS 2 is activated, the first CPU 20 checks the information stored in the shared memory 4. When a response command is stored, the first CPU 20 reads the response command via the system bus 5.

When the restart process is completed (S5), the cancel command generating unit 202 outputs a cancel command (S6). The cancel command is stored in the shared memory 4 via the system bus 5 by using the inter-OS communication.

The second CPU 30 performs the inter-OS communication to periodically check the information stored in the shared memory 4. When the cancel command is stored in the shared memory 4, the second CPU 30 reads the cancel command, and stops execution of the periodic command even in the valid period of the periodic command (S7).

When the second CPU 30 stops the periodic command, the second CPU 30 performs the inter-OS communication to store a cancel command response and a waiting command response in the shared memory 4 via the system bus 5.

The first CPU 20 performs the inter-OS communication to periodically check the information stored in the shared memory 4. When the cancel command response and the waiting command response are stored, the first CPU 20 reads the cancel command response and the waiting command response from the shared memory 4 via the system bus 5. The cancel command response is a command which causes the first CPU 20 to output a waiting command.

The cancel command response causes the first CPU 20 to output a waiting command (S8). The shared memory 4 stores the waiting command.

The second CPU 30 performs the inter-OS communication to periodically check the information stored in the shared memory 4. When the waiting command is stored, the second CPU 30 reads the waiting command via the system bus 5. The command converting unit 301 converts the waiting command into a periodic command (S9), and outputs it to the specified driver 69.

Other Exemplary Embodiments

The present invention is not limited to the above-described exemplary embodiment, and various modifications may be made without departing from the gist of the present invention. As other exemplary embodiments, for example, the information processing programs may be provided by recording them in a storage medium such as a compact disc-read-only memory (CD-ROM), or may be obtained through a network so as to be executed.

Some of the programs used in the above-described exemplary embodiment may be implemented through hardware, such as an application specific integrated circuit (ASIC) or a field programmable gate array (FPGA).

As described above, the exemplary embodiments are described. These exemplary embodiments are merely examples, and do not limit the invention according to the scope of claims. A novel exemplary embodiment may be carried out in other various manners. Various types of omission, replacement, modification, and the like may be made without departing from the gist of the present invention. All of the combinations of the features described in the exemplary embodiments are not necessarily required for a unit for addressing the issue of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first controller circuit that is controlled by a first operating system and that outputs a waiting instruction waiting persistently until a response is transmitted from a control target; and
   a second controller circuit that is controlled by a second operating system different from the first operating system, that converts the waiting instruction outputted from the first controller circuit into a periodic instruction waiting periodically until a response is transmitted from the control target, and that outputs the periodic instruction to the control target.

2. The information processing apparatus according to claim 1, further comprising:
   a shared memory that is connected to the first controller circuit and the second controller circuit and that stores the waiting instruction outputted from the first controller circuit,
   wherein the second controller circuit reads out the waiting instruction stored in the shared memory, and converts the waiting instruction into the periodic instruction.

3. The information processing apparatus according to claim 2,
   wherein the first controller circuit stores a termination instruction in the shared memory, the termination instruction being an instruction to terminate the periodic instruction and being supplied due to a restart performed after an abnormal termination of the first operating system, and
   wherein the second controller circuit stops the periodic instruction on the basis of the termination instruction obtained from the shared memory.

4. A non-transitory computer readable medium storing a program causing a computer to execute a process for information processing, the computer including a first controller circuit that is controlled by a first operating system and a second controller circuit that is controlled by a second operating system different from the first operating system, the process comprising:
   outputting, using the first controller circuit, a waiting instruction waiting persistently until a response is transmitted from a control target; and
   converting, using the second controller circuit, the waiting instruction outputted from the first controller circuit into a periodic instruction waiting periodically until a response is transmitted from the control target, and outputting the periodic instruction to the control target.

5. A non-transitory computer readable medium storing a program causing a computer to execute a process for information processing, the computer including a first controller circuit and a second controller circuit, the process comprising:
   converting, using the second controller circuit, a waiting instruction into a periodic instruction and outputting the periodic instruction to a control target, the waiting instruction being output from the first controller circuit and persistently waiting until a response is transmitted from the control target, the periodic instruction waiting periodically until a response is transmitted from the control target.

* * * * *